June 3, 1958  C. W. HOUGH  2,837,017
PNEUMATIC RELEASE FOR CAMERA SHUTTERS
Filed Feb. 2, 1953  2 Sheets-Sheet 1
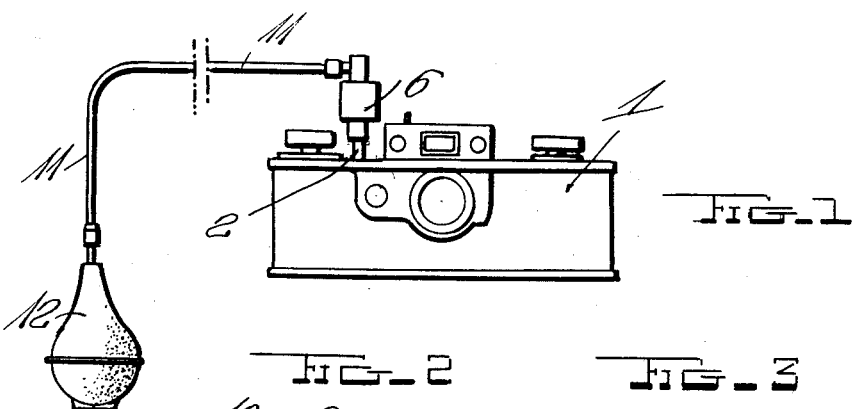
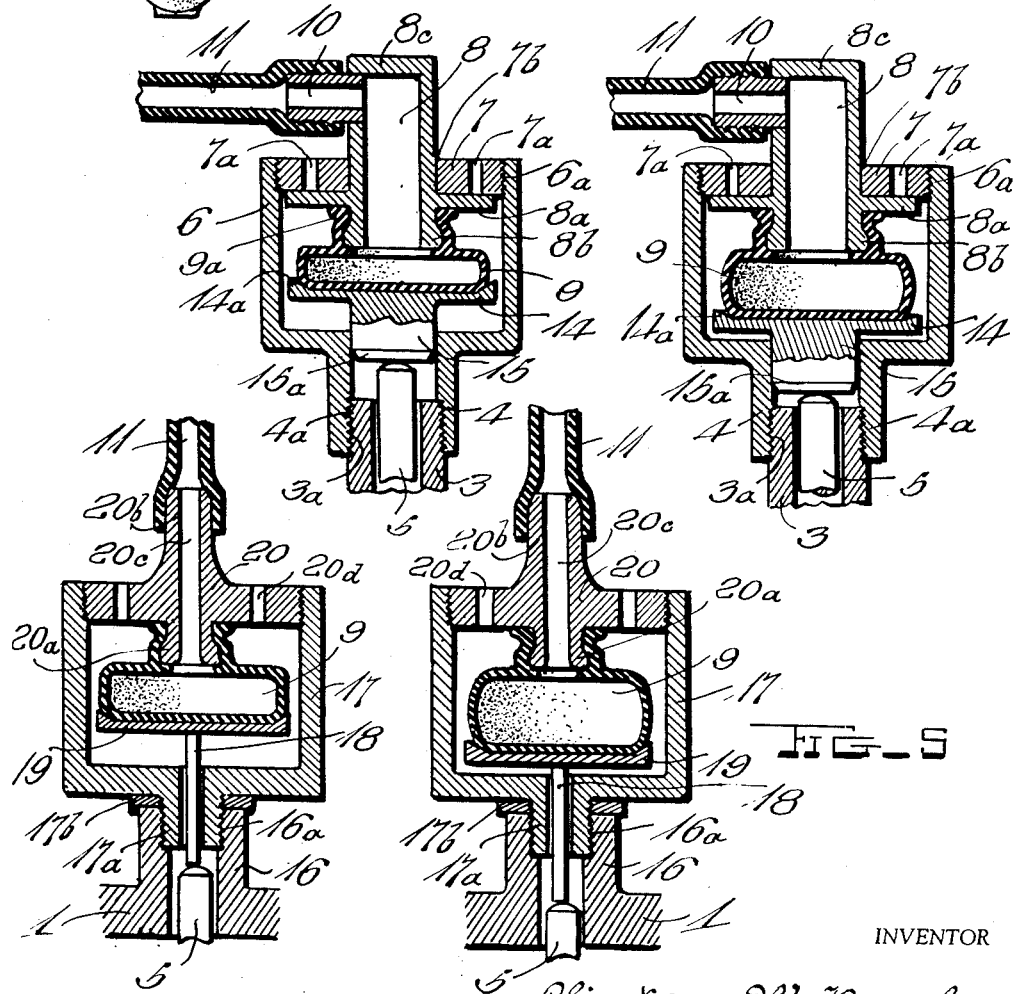
INVENTOR
Clinton W. Hough,
BY
John B. Brady
ATTORNEY

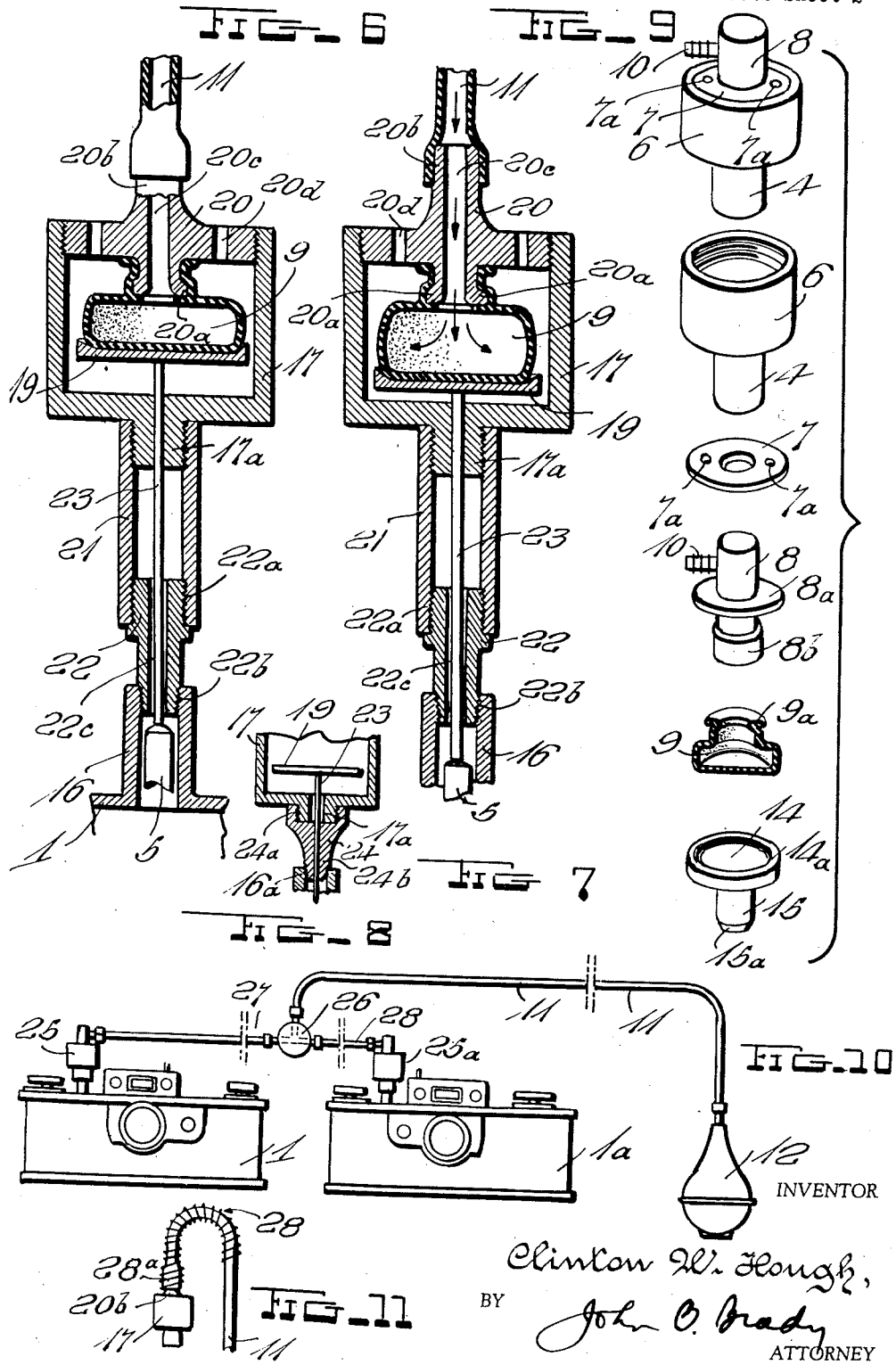

United States Patent Office 2,837,017
Patented June 3, 1958

2,837,017

PNEUMATIC RELEASE FOR CAMERA SHUTTERS

Clinton W. Hough, Pasadena, Calif.

Application February 2, 1953, Serial No. 334,682

2 Claims. (Cl. 95—54)

My invention relates broadly to cameras and more particularly to a construction of pneumatic release for camera shutters.

One of the objects of my invention is to provide an improved construction of pneumatic release for camera shutters which may be remotely controlled in a manner which will prevent movement or displacement from being imparted to the camera during the taking of photographs.

Another object of my invention is to provide a construction of pneumatic release for camera shutters which may be readily applied to various types of cameras in lieu of the conventional Bowden wire type of release which often occasions the transmission of shocks to the camera resulting in slight movement of the camera and imperfections in the resulting photograph.

Still another object of my invention is to provide a construction of pneumatic release for camera shutters which is readily applicable to the synchronizing of two or more cameras for simultaneous operation without the necessity of employing an extended wire member with all of the inherent disadvantages of entanglement for operation of the several shutters for simultaneous operation from a remote position.

Still another object of my invention is to provide a construction of pneumatic release for camera shutters in which the spring in the camera is employed as motive means for normally maintaining the pneumatic release of my invention in collapsed condition ready to be activated by air pressure for developing a force sufficient to overcome the bias of the spring in the camera for releasing the camera shutter whereby it becomes unnecessary to add any type of spring device to the conventional camera in obtaining all of the advantages of the pneumatic release of my invention.

A still further object of my invention is to provide a construction of pneumatic release for camera shutters which may be applied to two or more cameras for exposing the cameras at intervals for sequence shots by adjusting the release wires to suitable lengths independent of the operation of the pneumatic device of my invention.

Still another object of my invention is to provide a construction of pneumatic release for camera shutters having parts which are dependable and reliable and which do not deteriorate in time and that require substantially no maintenance and which will last practically for the life of the camera.

Still another object of my invention is to provide a pneumatic release for cameras which is particularly efficient for taking of bulb or time exposures whereby successive impulses may be applied to the camera shutter release by the successive applications of pressure on the manually controllable, remotely located hand bulb.

Still another object of my invention is to provide a construction of release for camera shutters which requires no oiling and contains no coil springs or springs in addition to the conventional spring already associated with the camera shutter whereby time of operation and friction are reduced to a minimum.

Other and further objects of my invention is to provide a construction of universally applicable pneumatic release for camera shutters as set forth more fully in the specification hereinafter following, by reference to the accompanying drawings, in which:

Figure 1 is a front elevational view showing the application of the pneumatic release for a camera shutter applied to a conventional camera;

Fig. 2 is a cross-sectional view taken through one form of device embodying my invention particularly applicable to a German Leica camera, the view showing the device in substantially collapsed position preparatory for an inflating impulse;

Fig. 3 is a view similar to the view illustrated in Fig. 2 and showing an inflating impulse applied to the pneumatic release;

Fig. 4 is a cross-sectional view showing a modified form of pneumatic release applied to a different type of camera, the release being shown in the substantially deflated condition;

Fig. 5 is a view similar to Fig. 4 but illustrating the same device with an inflating impulse supplied thereto;

Fig. 6 shows the application of the device of my invention to another type of camera and illustrating the deflated condition thereof;

Fig. 7 is a view similar to the view illustrated in Fig. 6 but illustrating the position of the pneumatic release when an inflating impulse is applied thereto;

Fig. 8 is a view illustrating a further construction of coupling between the device of my invention and a camera housing;

Fig. 9 illustrates the several component parts of the pneumatic release of my invention arranged in positions adjacent each other;

Fig. 10 schematically shows the application of the pneumatic release of my invention in the synchronizing of two cameras; and Fig. 11 is a detailed view showing the manner of clamping the air-control tube to the air inlet pipe of the shutter release.

My invention is directed to a closed system employing a pneumatic release for camera shutters. I dispense entirely with the conventional Bowden wire-type of shutter release with all of the unsatisfactory conditions incident thereto arising from entanglement of the wire when a control of any appreciative length is required and the imparting of movement or jerks to the camera which may impair the ultimate photograph taken by the camera. The conventional Bowden wire-type of release is particularly unsatisfactory where two or more cameras are to be synchronized because the movement of the two wires at the ends of the tubes in which they slide change in magnitude as the tubes are bent. Any change in the position of a multiple push button results in a change in the time the two cameras are exposed. The only solution in using wire or so-called cable releases is to push the button which operates the two cable releases with a very quick push and hope that you have done it fast enough to catch the same position of the subject in both cameras. Although considered, or at least advertised, as the ideal method of making exposures without moving the camera, in practice I have found quite the opposite. As the wire sheath which is attached to the camera is held and the push button attached to the wire or cable pushes the wire through the sheath, the camera is pulled at the same time that the shutter release is pushed and while these forces are advertised as "equal and opposite" this is not often the case because the contraction of the hand moves the hand and the camera which is attached to the hand through the sheath and the central wire and push. I have also found the electrically operated release type of shutter subject to necessity for substantial repair and adjustment and maintenance due to the requirement for solenoids, coacting armatures and batteries generally unsatisfactory.

My invention has resulted from the unsatisfactory operation that I have experienced when mechanical and electrical devices are used, and I have found the pneumatic release of my invention, as set forth herein, highly practical and successful in operation. I do not employ any type of spring in the attachment of my invention which is applied to the camera, but on the contrary, utilize the spring means already provided for cocking the shutter of the camera. I provide a cylindrical device which is attachable at the button-actuating position of the conventional camera. This cylinder device includes a piston and a member controlled thereby displaceable into the camera housing for imparting endwise movement to the spring-biased wire leading to the camera shutter. The position of the piston is controlled by the inflation of a resilient sack which operates within the closed cylinder of the device and against the piston therein for displacing the piston under conditions of inflation from a hand-controlled bulb for correspondingly imparting movement to the member which produces endwise displacement of the shutter wire within the camera housing. The member which extends from the piston within the control cylinder is biased by the spring within the camera to a position in which the resilient sack is collapsed preparatory to impulse expansion under control of a hand-actuated bulb for imparting displacement to the piston and movement of the shutter release wire within the camera for effecting a control operation.

Heretofore in the art, where cylinder and piston arrangements have been employed for operating a shutter, it has been necessary to provide for an additional coil spring for biasing the piston to a predetermined position, and levers and links have been required for interconnection with the shutter mechanism involving substantial additional manufacturing and operating difficulties. These prior arrangements may be classified as open or leakage systems. There was always leakage between the piston and cylinder, and the bulbs used were usually supplied with a valve which would admit air as the pressure on the bulb was removed to replenish that lost by leakage.

My invention employs a closed system in which the collapsible resilient sack is expandable under almost touch control of a hand bulb for performing a pneumatic release operation for the camera shutter. The complete unit is extremely light in weight and occupies very small physical overall space and has been found very practical and efficient in operation.

Referring to the drawings in more detail, reference character 1 designates a conventional camera which includes a shutter release actuator represented generally at 2 with respect to which the attachment of my invention is applied. The construction of various cameras differs in detail with respect to the accessibility of the camera release shutter and various types of attachments embodying my invention have been developed to fit different cameras, and I have developed various forms of couplings enabling the attachment of my invention to be universally used with various makes of cameras. In applying my device to the Leica German camera, for example, I provide the construction illustrated in Figs. 2 and 3 wherein there is an upwardly extending cylindrical member 3 projecting from the casing of camera 1. The cylindrical member 3 is externally screw-threaded as represented at 3a and the device of my invention includes a depending sleeve indicated at 4 which is internally screw-threaded as represented at 4a for engaging the external screw threads 3a on cylindrical member 3. The cylindrical member 3 constitutes part of a tube through which the shutter release or push wire 5 that acts upon the camera shutter extends. The push wire 5 is spring biased outwardly by the shutter mechanism of the camera so that the wire 5 is continuously urged upwardly to a position projecting beyond the end of cylindrical member 3, as represented in Fig. 2. The depending sleeve 4 connects with a cylinder 6 which is internally screw threaded at its extreme end, as represented at 6a, and receives the externally screw-threaded disc 7 which is provided with spanner wrench engaging apertures 7a enabling the disc to be screwed into or removed from the end of cylinder 6. The apertures 7a in disc 7, in addition to their function as means for enabling a spanner wrench to be inserted therein for removing and replacing the screw-threaded disc 7 in the cylinder 6, also permit the egress and input of air as the resilient sack 9 housed within the cylinder 6 is inflated and exhausted by the application of pressure to hand-actuating bulb 12. The disc 7 is centrally apertured at 7b for slidable passage of the tubular member 8. Tubular member 8 is provided with a circular flange 8a intermediate the opposite ends thereof, the flange abutting with and closing the spanner wrench engaging apertures 7a when the components of the device are assembled. The inner end of tubular member 8 is provided with a flange 8b on the extremity thereof over which the tubular neck of the resilient sack 9 may be engaged preparatory for expansion when inflated through the tubular member 8. The neck 9a of the resilient sack 9 is secured to tubular member 8 intermediate the flanges 8a and 8b, as illustrated in the drawings.

The outer end of the tubular member 8 is closed by an end wall represented at 8c, and in a position adjacent the end wall 8c I provide a radially extending coupling sleeve 10 that is screw threaded into the tubular member 8 and is ribbed along the surface thereof for engagement by the flexible tube 11 leading to a remote control position where hand-actuating bulb 12 connects with the end of flexible tube 11 for establishing sufficient pressure for inflating the resilient sack 9.

The cylinder 6 serves as a guide for the displaceable piston 14 which is centered within the cylinder 6 and is provided with a rearwardly extending, centrally disposed stud 15 which serves to center the piston 14 with respect to the interior of the depending sleeve 4. That is to say, the external diameter of stud 15 is slightly less than the internal diameter of the depending sleeve 4 so that stud 15 may readily slide axially within the sleeve 4. The piston 14 is flat with the peripheral edge thereof slightly upturned, as represented at 14a. The up-turned edge 14a serves to confine the resilient sack 9 with respect to the piston 14 as the resilient sack 9 is inflated. In the position illustrated in Fig. 2, the push wire 5 exerts a constant pressure against the end of stud 15 tending to move the piston 14 against the resilient sack 9 which is substantially collapsed. The length of stud 15 is selected so that in the total collapsed position of the resilient sack 9 the end of stud 15 will remain centered with respect to the internal bore of the tubular member 8. To facilitate entry of the stud 15 into the bore of sleeve 4, the end of stud 15 is beveled, as represented at 15a. Upon application of air pressure by manual manipulation of the bulb 12, the resilient sack 9 is inflated, as represented in Fig. 3, forcing piston 14 forwardly and projecting stud 15 through the bore of the depending sleeve 4 and imparting a thrust to the push wire 5 for actuating the release of the shutter mechanism. In operating the device, the pressure applied to the stud 15 through the inflation of resilient sack 9 must overcome the spring bias normally applied to the push wire 5 by the shutter release mechanism within the camera. As soon as the force imparted to stud 15 by the inflation of resilient sack 9 is removed, the spring bias applied through push rod 5 restores the device to the position illustrated in Fig. 2. There are no coil springs or other types of springs associated with the device of my invention as all of the required spring tension is supplied by the mechanism of the shutter release itself.

There are several advantages arising from the structure of the device as shown in Figs. 2 and 3; the device may be screwed on a camera without twisting the rubber connecting tube 11, as the part 8c with all its connected parts is free to rotate or remain stationary as the cylinder projection 4 and the cylinder are screwed onto the camera. Another advantage of this construction is that one or both cameras of a multiple camera set-up may be exposed manually by pressing on the outer end of part 8c in case of failure of the air supply for any reason. When two cameras are set up for taking stereo photographs or where one of a pair of cameras is loaded with color film and the other with black and white and it is desired to take only one picture the desired camera may be exposed by pressing the end of part 8c or if desired the selected camera may be exposed with the bulb by unscrewing the cylinder 6 from the other camera. Two or more devices may be connected to one bulb and as many cameras as desired operated in synchronization. There is no loss of air as the entire system is air tight.

Figs. 4 and 5 illustrate a modified form of the device of my invention applied to structures of cameras wherein the cylindrical member extending from the camera 1 is internally screw threaded instead of being externally screw threaded as in the structure of Figs. 2 and 3. In this arrangement, the cylindrical member 16 projects from the casing of camera 1 and is internally screw threaded, as represented at 16a, into which the externally screw-threaded cylindrical extension 17a of cylinder 17 extends with air-tight gasket 17b interposed therebetween. The extension 17a is apertured at its center and serves as a guide for the pin 18 which projects from the base of the piston 19. The pin 18 is engaged by the end of push wire 15 tending to maintain piston 19 in a position in which the resilient sack 9 is completely collapsed, as shown in Fig. 4.

Fig. 5 shows the opposite condition to that illustrated in Fig. 4 where resilient sack 9 has been inflated and piston 19 displaced to substantially the interior end of cylinder 17, moving pin 18 and applying thrust against the end of the outwardly biased push wire 5 and actuating the shutter release mechanism. The assembly of the resilient sack 9 with respect to the disc which closes the end of cylinder 17 is substantially the same as explained in connection with the form of my invention shown in Figs. 2 and 3, except that in the form of my invention shown in Figs. 4 and 5, the air intake is disposed centrally of the disc as represented at 20 in Figs. 4 and 5. In this arrangement, the disc is shown as having a projecting portion 20a extending interiorly of cylinder 17 and around which the neck of the resilient sack 9 is stretched and secured interiorly of the cylinder 17. The disc has an outwardly projecting coupling tube represented at 20b to which the flexible tube 11 connects. An interior passage 20c through the projections at opposite sides of the disc conveys the air to the interior of resilient sack 9 enabling the sack 9 to be inflated in pulses for displacing pin 18 from the position illustrated in Fig. 4 to the position illustrated in Fig. 5.

In Figs. 6 and 7, I have shown a further modified form of my invention wherein the control device may be coupled in various ways to the camera. In this arrangement, an assembly of air-control operating device is employed similar to that illustrated in Figs. 4 and 5, except that the extension 17a of cylinder 17 is coupled to the end of a cylindrical sleeve shown at 21. Sleeve 21 is internally screw threaded at opposite ends thereof, and at the upper end sleeve 21 engages the externally screw-threaded extension 17a while at the other end the sleeve 21 engages the coupling member shown at 22. The coupling member 22 is externally screw threaded at one end, as shown at 22a, to engage the interior screw threads of sleeve 21 while at the opposite extremity coupling member 22 is externally screw threaded, as represented at 22b, for engaging interior screw threads in cylindrical member 16 projecting from the camera 1. The coupling member 22 has an axially extending bore 22c extending therethrough for the passage of the extended wire 23 depending from the piston 19. The extended wire 23 passes through the center of sleeve 21 and through the bore 22c in coupling member 22 and into the cylindrical member 16 where it abuts against the projecting end of the push wire 5.

In the arrangement shown in Fig. 6, the resilient tension offered by push wire 5 through the spring-driven shutter mechanism of the camera serves to maintain piston 19 against resilient sack 9 which is shown in the substantially collapsed state. However, when an impulse of air pressure is applied, as in Fig. 7, through the resilient sack 9, the extended wire 23 is thrust downwardly, and correspondingly displaces push wire 5 for operating the shutter release mechanism. Ports 20d in disc 20, in both of the forms of my invention shown in Figs. 4–5 and 6–7, allow egress and input of air with respect to cylinder 17 as sack 9 is inflated and deflated in addition to their coaction with a spanner wrench for opening and closing the glider.

In Fig. 8 I have shown a still further modified form of my invention wherein the externally screw-threaded extension 17a of cylinder 17 is directly engaged by the internally screw-threaded end 24a of the coupling member 24. The opposite end 24a of the coupling member 24 engages the internal screw threads 16a of the cylindrical member 16 extending from camera 1. This provides a more compact assembly of the device of my invention on the camera. The coupling 24 has an internal bore extending therethrough serving as a guide for the extended wire 23 leading from piston 19 and facilitating the operation of the shutter release mechanism.

In Fig. 9 I have shown the completely assembled device of Figs. 2 and 3 of my invention at 25 in perspective while beneath this view I have shown the several component parts in perspective. Similar reference characters are employed to designate the parts already described in Figs. 2 and 3. Comparison of the parts in Fig. 9 with the assembled parts shown in Figs. 2 and 3 will facilitate an understanding of the construction. It will be noted particularly that the resilient sack 9 is pre-formed so that a flat operating surface is presented to the piston 14. Thus, as the impulses of air pressure are supplied to the resilient sack, the expansion of the sack under conditions of inflation is confined against the face of the piston 14 rather than against the interior walls of cylinder 6.

Fig. 10 shows the application of my invention to the synchronized operation of a pair of cameras by remote control. In this application of my invention, camera 1 is operated simultaneously with camera 1a by use of the attachment shown at 25 on camera 1 and at 25a on camera 1a. The flexible tube 11 connects through the coupling member 26 with the flexible tubes 27 and 28 leading to the devices 25 and 25a, respectively. The fact that the push wires within each of the cameras determine the operation of the release mechanism upon actuation of the devices 25 and 25a under remote control enable the operation of the cameras to be predetermined with precision and without the inaccuracies otherwise arising from the use of extended lengths of control wire with their inherent hazards of entanglement. I have operated two cameras in this manner from a distance of more than 200 feet using flexible tubing shown at 11 of $\frac{1}{16}''$ bore. This capability is important in bird and wild life photography and where the operator desires to be included in the picture.

In Fig. 11 I have shown one manner of protecting the rubber tube connection on the intake pipe of the device of my invention. I have illustrated the form of my invention shown in Figs. 4–7 wherein the air intake tube extends from the top of the operating cylinder. In this arrangement the rubber tube 11 fits over the end of the air-intake pipe represented at 20b. After the tube is stretched over the inlet pipe, a coil spring 28 carried by the exterior of the tube 11 is twisted and expanded so that it covers the flexible rubber tubing at 28a over the inlet pipe 20b. The spring then serves to clamp the rubber tubing on the inlet pipe and also prevents any kinking of the tubing near the camera which would necessitate a greater than normal air pressure to straighten out the kink before the shutter release mechanism can operate normally.

The attachments of my invention are particularly desirable in the taking of "time" and "bulb" exposures with a single or a multiple number of cameras. For "time" and "bulb" exposures where an increase in air pressure depresses the camera shutter release button and opens the camera shutter, maintenance of said pressure holds the camera shutter release button in the open position for the desired length of exposure time when release of pressure on the bulb permits the camera shutter release button to return to the closed position thus closing the camera shutter and terminating the exposure. As the pneumatic system is entirely closed and operation depends entirely on air pressure resulting from hand pressure on the connected bulb, time exposures may be of any desired time duration. There is no loss of air and shutters will not close until pressure on the bulb is removed. There is no loss of air and there are no air valves in bulbs or any part of the system as required by cylinder and sliding piston types of pneumatic releases. In other words, a very sensitive manual control for the shutter mechanism is provided wherein the inflation and deflation of the resilient sack interposed between the mechanically displaceable member within cylinders 6 or 17 responds to very slight pressures exerted against hand-acutated bulb 12 for controlling the operation of the shutter mechanism. The time period of operation of the shutter mechanism is thus manually controlled so that exposure time is directly proportional to manual pressure applied against bulb 12.

While I have described my invention in certain preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A pneumatic actuator for camera shutters comprising a casing screw threaded at one end and provided with a fastening extension on the other end for attachment to a shutter housing, said extension having an axial bore therethrough, an actuating member slidably mounted in the bore in said extension, a piston reciprocative in said casing and connected with the internal end of said actuating member, a screw threaded closure member engageable with the screw threaded end of said casing, a plate revolvable and lineally slidable within said casing in abutment with the inner face of said closure member, a tubular member mounted in said plate and having an internal projection and an external projection extending axially therefrom in opposite directions, said external projection extending centrally through an aperture in said screw threaded closure member and revolvable and lineally slidable with respect thereto, a pressure tube connection extending from one side of said external projection of said tubular member and angularly disposed with respect to the axis of said tubular member whereby said plate and said tubular member with said pressure tube connection extending therefrom swivel with respect to said casing, a resilient sack disposed within said casing and connected with the internal projection of said tubular member and disposed in a position in contact with said piston whereby pressure introduced into said resilient sack from said pressure tube expands said sack against said piston for displacing said piston within said casing and correspondingly moving said actuating member.

2. A pneumatic actuator for camera shutters comprising a cylindrical casing open at one end and provided with a fastening extension on the other end for attachment to a shutter housing, said extension having an axial bore therethrough, an actuating member slidably mounted in the bore in said extension, a piston reciprocative in said casing and connected with said actuating member, a closure member engageable with the open end of said casing, means to connect said closure member to said casing, said closure member having a central aperture therein, a plate revolvable and lineally slidable within said casing, said plate terminating in a circular periphery conforming with the internal contour of said casing and adapted to abut with the inner face of said closure member, a tubular member mounted in said plate and having axially disposed internal and external projections, said external projection extending centrally through the aperture in said closure member and being revolvable and lineally slidable with respect thereto, a pressure tube connection extending from one side of said external projection of said tubular member and disposed substantially normal to the axis thereof whereby said plate and said tubular member with the pressure tube connection thereon may swivel with respect to said casing, a resilient sack disposed within said casing and connected with the internal projection of said tubular member and disposed in contact with said piston whereby pressure introduced into the resilient sack from said pressure tube connection expands said sack against said piston for displacing said piston within said casing and correspondingly moving said actuating member and means in said closure member for facilitating the connection and disconnection of said closure member with the open end of said cylindrical casing.

References Cited in the file of this patent

UNITED STATES PATENTS

| | | |
|---|---|---|
| 236,916 | Suder | Jan. 25, 1881 |
| 250,214 | De Voe | Nov. 29, 1881 |
| 266,035 | Higgins | Oct. 17, 1882 |
| 341,887 | Collison | May 18, 1886 |
| 765,980 | Mercier | July 26, 1904 |
| 1,102,278 | Lipp | July 7, 1914 |
| 2,202,138 | Buckham | May 28, 1940 |
| 2,298,586 | Phillips | Oct. 13, 1942 |
| 2,333,776 | Gillon et al. | Nov. 9, 1943 |
| 2,615,379 | De Groff | Oct. 28, 1952 |
| 2,650,501 | Murray | Sept. 1, 1953 |

FOREIGN PATENTS

| | | |
|---|---|---|
| 24,296 | Germany | Nov. 9, 1883 |